United States Patent Office 3,346,611
Patented Oct. 10, 1967

3,346,611
PREPARATION OF THIOL ESTERS HAVING
ALPHA-SULFIDE LINKAGES
Richard C. Doss, Bartlesville, Okla., assignor to Phillips
Petroleum Company, a corporation of Delaware
No Drawing. Filed Jan. 8, 1965, Ser. No. 424,196
10 Claims. (Cl. 260—455)

ABSTRACT OF THE DISCLOSURE

A thiol ester having a sulfide linkage alpha to the ester group is formed by contacting a thiol with an alpha-oxo aldehyde. The thiol ester products are useful as insecticides and lubricants.

This invention relates to a method of producing thiol esters.

Heretofore mercaptals and hemimercaptals have been produced by a low temperature reaction of thiols with alpha-oxo aldehydes.

Also, heretofore in the production of thiol esters various methods have been used, some of which produced a reaction mass which was relatively corrosive and therefore difficult to transport, store and the like.

Quite unexpectedly, it has been found that a thiol ester having a sulfide linkage alpha to the ester group is produced by contacting a thiol with an alpha-oxo aldehyde if the contacting is carried out in a temperature range of from about 80° C. to about 300° C.

Although it is not completely understood and therefore it is not desired to be bound thereby, it appears that the reaction of this invention occurs by the following mechanism:

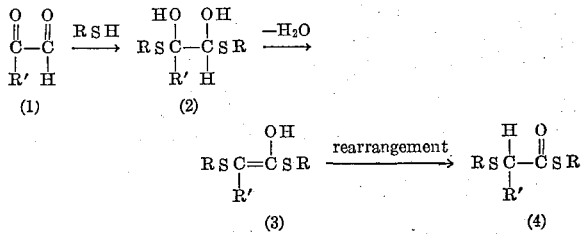

Quite unexpectedly, it appears from the above formula that from the dihemimercaptal intermediate (2) water is eliminated to produce the intermediate (3) which in turn rearranges to the thiol ester (4).

Accordingly, it is an object of this invention to provide a new and improved method of producing thiol esters.

Other aspects, objects and the several advantages of this invention will be readily apparent to those skilled in the art from the description and the appended claims.

According to this invention, a thiol ester having a sulfide linkage alpha to the ester group, said thiol ester having the formula

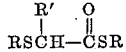

is prepared by the reaction of a thiol of the formula RSH with an alpha-oxo aldehyde of the formula

where R is a monovalent hydrocarbon radical containing from 1 to 18 carbon atoms, preferably from 1 to 8, still more preferably from 1 to 6, and selected from the group consisting of alkyl, cycloalkyl, alkenyl, cycloalkenyl, aryl, and combinations thereof, preferably alkyl; R′ is a member selected from the group consisting of R and hydrogen, preferably hydrogen; and the total number of carbon atoms in the thiol ester molecule is from 4 to 40, preferably from 4 to 18.

Although the alpha-oxo aldehyde is preferably employed as such, it should be noted that it can also be employed in this invention as a hydrate, or in a polymeric form which readily depolymerizes under the reaction conditions.

As examples illustrative of the reaction of my invention, glyoxal reacts with ethanethiol to give ethyl (ethylthio)thiolacetate, and pyruvaldehyde reacts with benzenethiol to give phenyl 2-(phenylthio)thiolpropionate. Similarly, cyclopentaneglyoxylaldehyde reacts with 2-propene-1-thiol to give allyl α-(allylthio)cycopentanethiolacetate, 2-cyclopentene-1-glyoxylaldehyde reacts with 2-cyclooctene-1-thiol to give 2-cyclooctene-1-yl α-(2-cycloocten - 1-ylthio)-2cyclopentene-1-thiolacetate, phenylglyoxal reacts with cyclopentanethiol to give cyclopentyl α-(cyclopentylthio)phenylthiolacetate, and 2 - oxo-4-pentenal reacts with 2-propanethiol to give isopropyl 2-(isopropylthio)-4-pentenethiolate.

Examples of some thiol esters which can be prepared by the method of this invention are methyl (methylthio)thiolacetate,
ethyl (ethylthio)thiolacetate,
propyl (propylthio)thiolaceate,
isopropyl 2-(isopropylthio)thiolpropionate,
isobutyl 2-(isobutylthio)hexanethiolate,
hexyl 2-(hexylthio)-3-butenethiolate,
7-ethyldecyl 2-(7-ethyldecylthio)thiolpalmitate,
octadecyl (octadecylthio)thiolacetate,
methyl 2-(methylthio)eicosanethiolate,
cyclohexyl α-(cyclohexylthio)phenylthioacetate,
cyclopentylmethyl (cyclopentylmethylthio)thiolacetate,
3-methycyclopenyl (3-methylcyclopentylthio)thiolacetate,
allyl α-(allylthio)cyclohexanethiolacetate,
2-methyl-4-hexenyl (2-methyl-4-hexenylthio)thiolacetate,
2-cyclooctene-1-yl (2-cyclooctene-1-ylthio)thiol acetate,
4-methyl-2-cyclohexen-1-yl (4-methyl-2-cyclohexen-1-ylthio)thiolacetate,
phenyl α-(phenylthio)-2-cyclohexene-1-thiolacetate,
p-tolyl (p-tolylthio)thiolacetate,
benzyl (benzylthio)thiolacetate, and
1-naphthyl (1-naphthylthio)thiolacetate.

Generally, any thiol having a monovalent hydrocarbon radical as described above with reference to R can be employed in this invention. Examples of such thiols are methanethiol, ethanethiol, 1-propanethiol, 2-propanethiol, 1-butanethiol, 2-butanethiol, 1-hexanethiol, 2-octanethiol, 7-ethyl-1-decanethiol, 1-octadecanethiol, cyclohexanethiol, cyclopentanemethanethiol, 3 - methylcyclopentanethiol, 2 - propene-1-thiol, 2-methyl-4-hexene-1-thiol, 2 - cyclooctene-1-thiol, 4-methyl-2-cyclohexene-1-thiol, benzenethiol, p-toluenethiol, α-toluenethiol, and 1-naphthalenethiol.

Examples of some α-oxo aldehydes which can be employed in the method of this invention are glyoxal, pyruvaldehyde, 2 - oxobutylraldehyde, 2-oxovaleraldehyde, 3-methyl - 2-oxobutyraldehyde, 2-oxohexanal, 4-methyl-2-oxovaleraldehyde, 2-oxooctanal, 2-oxodecanal, 6-ethyl-2-oxododecanal, 2 - oxoeicosanal, cyclohexaneglyoxylaldehyde, 3 - methylcyclopentaneglyoxylaldehyde, cyclopentanepyruvaldehyde, 2-oxo-4-pentenal, 2-oxo-5-hexenal, 2-cyclohexene - 1 - glyoxylaldehyde, 4-methyl-2-cyclopentene-1-glyoxylaldehyde, phenylglyoxal, p-tolylglyoxal, phenylpyruvaldehyde and 2-naphthaleneglyoxylaldehyde. If desired, any of these α-oxo aldehydes can be employed as a hydrate. Also, those α-oxo aldehydes which polymerize to give polymeric substances which readily depolymerize under the reaction conditions can be employed in polymeric form.

Although the reaction of this invention can be carried out without the use of a solvent, it is preferred that an inert solvent selected from the group consisting of hydrocarbons, water, alcohols, ethers, and amides be employed. The solvent should be liquid under the reaction conditions and should be substantially non-reactive with the alpha-oxo aldehyde, thiol and thiol ester present. Among the solvents which can be employed are included hydrocarbons such as pentane, hexane, octane, decane, methylcyclopentane, cyclohexane, benzene, toluene, and xylene; water; alcohols such as methanol, ethanol, 1-propanol, 2-propanol, 1-butanol, 2-butanol, 1-hexanol, 2-octanol, 1-decanol, and cyclohexanol; ethers such as diethyl ether, ethyl propyl ether, dibutyl ether, dioctyl ether, anisole, diphenyl ether, tetrahydrofuran, dioxane, 2-methoxyethanol, and 1,2-dimethoxyethane; and amides such as formamide, acetamide, N-ethylformamide, N-methylacetamide, N-phenylacetamide, N,N-dimethylformamide, N,N-dimethylacetamide, N-ethyl-N-phenylformamide, caprolactam, N-methylcaprolactam, 2-pyrrolidinone, and 1-methyl-2-pyrrolidinone. Preferrred are aromatics having from 6 to 9 carbon atoms per molecule and cyclic and acyclic amides having from 3 to 6 carbon atoms per molecule, both inclusive.

Although the reaction of this invention can be carried out without the presence of a strong acid, an acid such as a hydrogen halide, sulfuric acid and the like, can be employed in an effective catalytic amount to aid in the reaction.

Although the reactants can be employed over a wide range of ratios, the mole ratio of thiol to α-oxo aldehyde should fall within the range of from about 2:1 to about 8:1, preferably from about 2:1 to about 5:1. The reaction time can vary from about 1 minute to about 24 hours, usually falling within the range of about 5 minutes to about 6 hours, depending on the reactivity of the reactants and the temperature employed.

The temperature also depends on the nature of the reactants and will be within the range of from about 80° C. to about 300° C., preferably from about 150° C. to about 250° C., still more preferably from about 175° C. to about 225° C. The reaction pressure need be only that required to maintain the reactants and/or solvent substantially in the liquid phase.

The thiol esters prepared by the method of this invention have general utility as insecticides and somewhat lesser utility as lubricants.

The following example will further illustrate the invention, although it is not intended that the invention be limited thereto.

*Example*

A mixture of 30.5 grams of 76 weight percent glyoxal containing 0.4 mole of glyoxal (1.7 moles) of 1-butanethiol, 200 ml. of benzene as solvent, and 10 ml. of concentrated hydrochloric acid to promote the formation of the dihemimercaptal (2) in the equation set forth above, was formed and heated at 200° C. with stirring, for 4 hours. The reaction mixture was cooled to room temperature, and diluted with water to dissolve water-soluble by-products, hydrochloric acid and unreacted glyoxal from the reaction mixture. The water-diluted reaction mixture was then extracted several times with benzene to remove the reaction products therefrom. The combined benzene extracts were dried over anhydrous magnesium sulfate and the drying agent was removed by filtration. The filtrate was concentrated on a steam bath to a residue weighing 119.6 grams.

Gas chromatographic analysis of the concentrated filtrate showed it contained 19.5 grams (22.1 mole percent yield) of butyl (butylthio)thiolacetate. The identity of the butyl (butylthio)thiolacetate was determined by comparison with an authentic specimen through the use of gas chromatography. The retention time of the product of the method of this example was the same as that of the authentic specimen of butyl (butylthio)thiolacetate when the product and specimen were mixed and injected simultaneously into the same chromatographic column.

Thus, butyl (butylthio)thiolacetate was produced according to this invention by the reaction of glyoxal with 1-butanethiol. The butyl (butylthio)thiolacetate referred to is a compound having the formula

Reasonable variations and modifications are possible within the scope of this disclosure without departing from the spirit and scope of the invention.

What is claimed is:

1. A method of preparing a thiol ester having a sulfide linkage alpha to the ester group comprising contacting a thiol of the formula RSH wherein R is a monovalent hydrocarbon radical containing from 1 to 18 carbon atoms and selected from the group consisting of alkyl, cycloalkyl, alkenyl, cycloalkenyl, and aryl with an alpha-oxo aldehyde, the contacting being carried out under a pressure sufficient to keep the reactants substantially liquid and at a temperature of from about 80 to about 300° C.

2. A method for preparing a thiol ester having a sulfide linkage alpha to the ester group comprising contacting a thiol of the formula RSH, with an alpha-oxo aldehyde of the formula

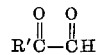

where R is a monovalent hydrocarbon radical containing from 1 to 18 carbon atoms and selected from the group consisting of alkyl, cycloalkyl, alkenyl, cycloalkenyl, aryl, R' is a member selected from the group consisting of R and hydrogen and the total number of carbon atoms in the thiol ester molecule formed is from 4 to 40, the contacting being carried out under a pressure sufficient to keep the reactants substantially liquid and at a temperature in the range of from about 80 to about 300° C.

3. The method according to claim 2 wherein said alpha-oxo aldehyde is employed in the hydrate form and the contacting takes place in the presence of an inert solvent.

4. The method according to claim 2 wherein R is an alkyl radical containing from 1 to 8 carbon atoms, R' is hydrogen, the total number of carbon atoms in the thiol ester molecule is from 4 to 18 and the temperature of the reaction is in the range of from about 150 to about 250° C.

5. A method for producing a thiol ester comprising contacting glyoxal with 1-butanethiol in the presence of benzene under a pressure sufficient to keep the reactants substantially liquid and at about 200° C.

6. A method for producing a thiol ester comprising contacting glyoxal with ethanethio in the presence of an inert solvent under a pressure sufficient to keep the reactants liquid and at a temperature of from about 150 to about 250° C.

7. A method for producing a thiol ester comprising contacting pyruvaldehyde with benzene thiol in the presence of an inert solvent under a pressure sufficient to keep the reactants liquid and at a temperature of from about 150 to about 250° C.

8. A method for producing a thiol ester comprising contacting cyclopentaneglyoxylaldehyde with 2-propene-1-thiol in the presence of an inert solvent under a pressure sufficient to keep the reactants liquid and at a temperature of from about 150 to 250° C.

9. A method for producing a thiol ester comprising contacting phenylglyoxal with cyclopentanethiol in the presence of an inert solvent under a pressure sufficient to keep the reactants liquid and at a temperature of from about 150 to about 250° C.

10. A method for producing a thiol ester comprising contacting 2-cyclopentene-1-glyoxylaldehyde with 2-cyclooctene-1-thiol in the presence of an inert solvent under a pressure sufficient to keep the reactants liquid and at a temperature of from about 150 to 250° C.

No references cited.

CHARLES B. PARKER, *Primary Examiner.*

B. BILLIAN, *Assistant Examiner.*